US011219967B2

(12) United States Patent
Kogel-Hollacher et al.

(10) Patent No.: US 11,219,967 B2
(45) Date of Patent: *Jan. 11, 2022

(54) MACHINING HEAD FOR A LASER MACHINING DEVICE

(71) Applicant: Precitec Optronik GmbH, Neu-Isenburg (DE)

(72) Inventors: Markus Kogel-Hollacher, Haibach (DE); Martin Schönleber, Aschaffenburg (DE)

(73) Assignee: PRECITEC OPTRONIK GMBH, Neu-Isenburg (DE)

(*) Notice: Subject to any disclaimer, the term of this patent is extended or adjusted under 35 U.S.C. 154(b) by 139 days.

This patent is subject to a terminal disclaimer.

(21) Appl. No.: 16/569,391

(22) Filed: Sep. 12, 2019

(65) Prior Publication Data

US 2020/0001395 A1 Jan. 2, 2020

Related U.S. Application Data

(63) Continuation of application No. 14/938,398, filed on Nov. 11, 2015, now Pat. No. 10,449,631, which is a
(Continued)

(30) Foreign Application Priority Data

May 15, 2013 (DE) .......................... 102013008269.2

(51) Int. Cl.
*B23K 26/04* (2014.01)
*B23K 26/03* (2006.01)
(Continued)

(52) U.S. Cl.
CPC ............ *B23K 26/048* (2013.01); *B23K 26/03* (2013.01); *B23K 26/046* (2013.01);
(Continued)

(58) Field of Classification Search
CPC .... B23K 26/03; B23K 26/048; B23K 26/046; B23K 26/0643; B23K 26/0665; B23K 26/082; G01B 9/02044; G01B 9/02091
See application file for complete search history.

(56) References Cited

U.S. PATENT DOCUMENTS 6,574,024 B1   6/2003  Liu
7,121,671 B2  10/2006  Lee et al.
(Continued)

FOREIGN PATENT DOCUMENTS

CA   2912135 A1   11/2014
DE   10155203     6/2003
(Continued)

OTHER PUBLICATIONS

"Extending the effective imaging range of Fourier domain optical coherence tomography using a fiber optic switch", National Institute of Heath, NIH Public Access, https://www.ncbi.nlm.nih.gov/pmc/articles/PMC3690507/; Hui Wang, Yinsheng Pan, and Andrew M. Rollins; published Nov. 15, 2008; 8 pages.
(Continued)

*Primary Examiner* — John J Norton
(74) *Attorney, Agent, or Firm* — Lempia Summerfield Katz LLC

(57) ABSTRACT

A processing head for a laser processing device adapted for processing a workpiece using laser radiation has: adjustable focusing optics to focus laser radiation in a focal spot having an adjustable distance from the processing head; an optical coherence tomograph to measure a distance between the processing head and the workpiece by measuring an optical interference between measuring light reflected by the workpiece and measuring light not reflected by the workpiece; a path length modulator that can change, synchronously with and dependent on a change of the focal spot distance from the processing head, an optical path length in an optical path
(Continued)

along which measuring light propagates; a scanning device, which deflects the laser radiation in different directions; and a control device, which i) controls a focal length of the focusing optics in such a way that the focal spot is situated at a desired location on the workpiece, ii) receives, from the coherence tomograph, information representing the distance between the processing head and the workpiece, and iii) uses information received from the coherence tomograph for a continuous correction of a positioning of the focal spot on the workpiece.

11 Claims, 9 Drawing Sheets

Related U.S. Application Data continuation of application No. PCT/EP2014/001234, filed on May 8, 2014.

(51) Int. Cl.
| | |
|---|---|
| G01B 9/02 | (2006.01) |
| B23K 26/082 | (2014.01) |
| B23K 26/046 | (2014.01) |
| B23K 26/06 | (2014.01) |

(52) U.S. Cl.
CPC ...... *B23K 26/0643* (2013.01); *B23K 26/0665* (2013.01); *B23K 26/082* (2015.10); *G01B 9/02028* (2013.01); *G01B 9/02044* (2013.01); *G01B 9/02063* (2013.01); *G01B 9/02091* (2013.01)

(56) References Cited

U.S. PATENT DOCUMENTS

| | | | |
|---|---|---|---|
| 8,410,392 B2 | 4/2013 | Kogel-Hollacher et al. | |
| 8,585,686 B2 | 11/2013 | Bergt et al. | |
| 8,982,339 B2 | 3/2015 | Schonleber et al. | |
| 9,757,817 B2 | 9/2017 | Webster | |
| 10,449,631 B2 | 10/2019 | Kogel-hollacher et al. | |
| 2005/0107773 A1 | 5/2005 | Bergt et al. | |
| 2007/0046948 A1 | 3/2007 | Podoleanu et al. | |
| 2008/0281413 A1 | 11/2008 | Culbertson et al. | |
| 2010/0155375 A1 | 6/2010 | Dietz et al. | |
| 2010/0324542 A1 | 12/2010 | Kurtz | |
| 2010/0328606 A1 | 12/2010 | Peyman | |
| 2012/0138586 A1 | 6/2012 | Webster et al. | |
| 2013/0120740 A1 | 5/2013 | Schonleber | |
| 2014/0088574 A1 | 3/2014 | Bergt et al. | |
| 2016/0039045 A1 | 2/2016 | Webster | |
| 2016/0059347 A1 | 3/2016 | Kogel-hollacher et al. | |
| 2020/0001395 A1 | 1/2020 | Kogel-hollacher et al. | |

FOREIGN PATENT DOCUMENTS

| | | |
|---|---|---|
| DE | 10202036 | 7/2003 |
| DE | 102010016862 | 9/2011 |
| DE | 102012207835 | 11/2012 |
| DE | 102013008269 C5 | 1/2019 |
| EP | 1977850 | 10/2008 |
| WO | 2012152881 | 11/2012 |
| WO | 2014183849 A1 | 11/2014 |

OTHER PUBLICATIONS

"Imaging and full-length biometry of the eye during accommodation using spectral domain OCT with an optical switch", Biomedical Optics Express Jul. 1, 2012;3(7):1506-20;. published Jun. 6, 2012; https://www.ncbi.nlm.nih.gov/pmc/articles/PMC3395477/; 15 pages.
"Notice of Opposition", Mar. 8, 2017, filed in corresponding German Patent 10 2013 008 269; 31 pages.
Office Action cited in the Canadian patent application No. 2,912,135; dated Sep. 23, 2020; 9 pp.
Schmitt, R. et al., Process monitoring in laser micro machining, Photonik International, 11, pp. 57 to 59, Mar. 2013; 4 pp.
Wiesner, M. et al., Optical coherence tomography for process control of laser micromachining, Review of Scientific Instruments, vol. 81/Issue No. 3, p. 033705-1 to 033705-7, Mar. 24, 2010; 7pp.

MACHINING HEAD FOR A LASER MACHINING DEVICE

CROSS-REFERENCE TO RELATED APPLICATIONS

This application is a continuation of, and claims priority to and the benefit of, co-pending U.S. application Ser. No. 14/938,398 filed on Nov. 11, 2015 and entitled "Machining Head for a Laser Machining Device", which is a continuation of International Patent Application PCT/EP2014/001234 filed May 8, 2014 and which claimed priority to and the benefit of German patent application No. 10 2013 008 269.2 filed May 15, 2013. The full disclosures of these earlier applications are hereby incorporated herein by reference.

BACKGROUND OF THE INVENTION

1. Field of the Invention

The invention relates to a processing head for a laser processing device, with which workpieces can be welded, cut or otherwise processed.

2. Description of the Prior Art

Laser processing devices normally comprise a laser radiation source which may, for example, be a fibre laser or a disc laser. A laser processing device further includes a processing head, which focuses the laser radiation generated by the laser radiation source in a focal spot, and a beam supply device, which supplies the laser radiation generated by the laser radiation source to the processing head. The beam supply device may comprise optical fibres or other optical waveguides and/or one or more deflecting mirrors with plane or curved surfaces. The processing head can be fastened to a movable robot arm or another moving device which enables a three-dimensional positioning. The laser radiation source is often arranged further away from the processing head or a moving device carrying the latter.

Hitherto the workpieces to be processed have usually been brought into a defined position by handling devices. The processing head is then guided with the aid of the robot at a distance of a few centimetres above the stationary workpiece. Since the processing head is heavy, it is not possible to perform very fast movements, as would be appropriate for example in spot welding operations. In principle, the workpiece could additionally be moved, but this increases the constructional expenditure on the handling devices.

In order to be able to process workpieces quickly at locations lying far apart, laser processing devices have therefore been developed in which the focal spot of the laser radiation is guided with the aid of a scanning device, which usually includes an arrangement of galvanomirrors, over the workpiece. If the processing head is far enough away (e.g. about 50 cm) from the workpiece, locations lying far apart on the workpiece can be processed extremely quickly by the laser radiation. The movement of the relatively heavy processing heads is thus replaced by movements of the light galvanomirrors in the scanning device. Processing methods in which the processing head is situated far away from the workpiece and include a scanning device are often called remote laser welding (or welding-on-the-fly) or remote laser cutting.

Besides the higher processing speed, these methods have the advantage that spatter and other contamination arising during the processing can hardly reach and contaminate the processing head any more. Protective glasses on the processing head thus need to be replaced less frequently, thereby reducing the downtimes. Moreover, the processing head no longer needs to be moved at all or if necessary moved only relatively slowly, making a robot redundant or more cost-effective.

A problem when using such laser processing devices which has hitherto not yet been satisfactorily solved is that it is difficult to position the focal spot, the diameter of which in welding processing mostly lies between 100 µm and 500 µm and in cutting processing may be 20 µm and less, precisely on the surface of the workpieces to be processed. Therefore, it has hitherto not been possible, for example, to produce fillet weld seams at lap joints of galvanised steel plates, because the focal spot cannot be positioned accurately enough in the fillet weld. For this reason, hitherto galvanised steel plates have mostly been joined by a laser deep welding process, in which an air gap must be left between the surfaces. This air gap is necessary so that the zinc coating melted on in an explosive manner can spread. The formation of cavities and defects along the weld seam can thereby be prevented. In order to keep the steel plates at a distance, they must have distance-maintaining indentations. The difficulty in reliably producing fillet weld seams thus ultimately leads to restrictions in the design of the workpieces and additional material consumption.

The reasons why the focal spot cannot be positioned accurately enough on the workpieces to be processed are as follows. Hitherto in remote laser processing the focal spot has been guided over the workpieces to be processed in accordance with a predetermined control program. Shape deviations of the workpieces themselves and positioning tolerances of the handling devices and optionally used robot, however, result in the location to be processed on the workpiece often not being situated at its desired position. Since such deviations are not taken into account in the control, the processing actually takes place outside the desired position.

It would be ideal if the focal spot could track the actually encountered spatial arrangement of the workpieces in a regulating process. For this purpose, however, it would be necessary to measure this actual spatial arrangement of the workpieces to be processed relative to the processing head or another reference point during the laser processing in real time. However, it has not been possible hitherto to carry out such a measurement successfully.

An observation of the processing location with the aid of a camera does not therefore lead to the desired improvements, because the camera captures only a 2D projection of the workpieces. If the beam path of the camera runs coaxially with the laser radiation, as is known in the prior art, although a lateral offset along the directions X and Y can be measured accurately, the distance between the workpiece and the processing head along the Z direction cannot be measured accurately. Because for high process quality, measuring accuracies are required in the Z direction which are in the order of around 400 µm for welding processing and in the order of around 100 µm for cutting processing.

For light-section or triangulation methods the distance between the processing head and the workpiece is too great to be able to measure with sufficient precision.

Chromatic-confocal measuring methods are also unsuitable, because on the one hand the numerical aperture of the focusing optics in the processing head is too low and on the other hand the chromatic longitudinal aberration thereof is too small to be able to cover a sufficient measuring range.

For distance measurement during the laser processing, some time ago the use of optical coherence tomographs (OCT) was proposed, cf. in particular EP 1 977 850 B1, DE 10 2010 016 862 B3 and DE 10 2012 207 835 A1. Optical coherence tomography enables high-precision distance measurement and even the generation of a 3D profile of the scanned surfaces when the measuring beam is guided scanner-like over the surfaces.

For remote laser processing in which the distance between the focal spot and the processing head can vary in the Z direction by up to 50 cm within fractions of a second, the optical coherence tomographs known in the prior art are, however, not suitable. Coherence tomographs which operate in the time domain (TD-OCT) usually contain a mirror in the reference arm of the coherence tomograph which modulates the optical path length thereof. The mirror vibrates at high frequency in the axial direction, whereby depth information can be obtained sequentially. The moving distance covered by the movable mirror is, however, only in the order of a few millimetres. The measuring range of such TD-OCTs is thus likewise only a few millimetres and would thus be a good two orders of magnitude too small for remote laser processing.

Coherence tomography in the frequency domain (FD-OCT), in which the optical path length in the reference arm is not changed, can also achieve a measuring range of only a few centimetres. For conventional laser processing devices in which the processing head is guided at an approximately constant distance over the workpieces, this measuring range is perfectly adequate. For remote laser processing, however, this measuring range is also insufficient.

From US 2012/0138586 A1 there is known a laser processing device having an OCT, in which the optical path length in a reference arm of the OCT can be tracked when the focal spot of the measuring beam is laterally deflected.

In DE 102 02 036 A1 there is described a laser processing device having a deflecting device and adjustable focusing optics. The focal spot of the laser radiation can thereby be moved in a manner which is plane and perpendicular to the beam direction.

SUMMARY OF THE INVENTION

The object of the invention is to specify a processing head of a laser processing device, with which large and especially greatly varying distances from a workpiece can also be precisely measured.

According to the invention this object is achieved by a processing head for a laser processing device, which is adapted for the processing of a workpiece using laser radiation, the processing head having adjustable focusing optics, which are adapted to focus the laser radiation in a focal spot, the distance between the focal spot and a processing head being changeable by changing the focal length of the focusing optics. The processing head may comprise a scanning device, which is adapted to deflect the laser radiation in different directions. The processing head further has an optical coherence tomograph, which is adapted to measure a distance between the processing head and the workpiece along a single direction and/or along different directions. Measuring light, which has been generated by a measuring light source and reflected by the workpiece, interferes in the coherence tomograph with measuring light which has travelled an optical path length in a reference arm. According to the invention, there is arranged in the reference arm a path length modulator which tracks the optical path length in the reference arm synchronously with and dependent on a change of the focal length of the focusing optics.

Through the synchronous tracking of the optical path length in the reference arm, the axial measuring range of the coherence tomograph can be increased in fact to almost any size. If, for example, the focal length of the focusing optics is changed such that the focal spot shifts by 30 cm away from the processing head, the path length modulator increases the optical path length in the reference arm synchronously by the same amount. Then for the new distance value the normal measuring range of the coherence tomograph is available again, which in the case of coherence tomographs in the frequency domain (FD-OCT) should not exceed about 8 mm, in order to maintain sufficient measuring accuracy. Since the coherence tomograph per se can measure only differences between the optical path lengths in the object arm and in the reference arm, the optical path length added in the tracking by the optical path length modulator is to be taken into account when calculating the actual distance between the workpiece and the processing head. The same applies, of course, conversely also in the case where the distance between the focal spot and the processing head is reduced.

In general, the control of the path length modulator is performed such that when the focal length of the focusing optics changes by $\Delta d$, the path length modulator changes the optical path length in the reference arm by $2\Delta d$. The factor 2 results from the fact that the measuring light guided in the object arm is also reflected and thus travels the focal length of the focusing optics twice. In principle, deviations from this condition are permissible and may also be appropriate in individual cases. For example, when changing from a processing location which is surrounded by elevated structures to a processing location which is surrounded by sunken structures, it may be expedient to depart from the aforementioned principle in order to be able to utilise the measuring range of the coherence tomograph optimally.

In principle, the invention is also applicable in coherence tomographs which operate in the time domain (TD-OCT). In this case, the optical path length modulator must additionally generate a high-frequency path length modulation with low path length stroke in the order of a few millimetres. But for application in remote laser processing, as already mentioned above, coherence tomographs in the frequency domain (FD-OCT) are generally more favourable, since they can cover a greater axial measuring range.

In remote laser processing, the focal length of the focusing optics can change by greater amounts within fractions of a second. At the same time, the measuring range of the optical coherence tomograph must also be able to be shifted by the same distance with the aid of the path length modulator. With the path length modulators described below, it is possible to produce smaller changes of the optical path length (OPD=20 mm) in less than 10 ms. Likewise it is possible to produce somewhat larger changes of the optical path length (OPD=100 mm) in less than 20 or greater changes of the optical path length (OPD=200 mm) in less than 50 ms.

In order to produce such large changes of the optical path length in such a short time, the path length modulator must not contain any larger masses which have to be moved quickly. Therefore, conventional path length modulators which comprise a linearly movable mirror in a beam path folded twice are too slow.

In one group of exemplary embodiments, the path length modulator therefore has a displaceable mirror, which is arranged in a folded beam path in such a way that on a shifting of the mirror by the distance s the optical path length in the reference arm changes by at least 8s, and preferably by at least 12s and further preferably by at least 16s. By such folding of the beam path, with relatively short axial shifts of the mirror large changes of the optical path length in the reference arm can be produced. Compared with conventional path length modulators in the reference arm, in which on a shifting of the mirror by the distance s the optical path length changes only by 2s, a compression of the beam path by a factor of at least 4 is therefore achieved. Here the sum of the optical path lengths on the outward and return path is regarded as the optical path length in the reference arm.

A 6-fold compression of the beam path can be produced, for example, when the path length modulator has an optical axis and two pairs of reflecting plane surfaces which are respectively arranged at an angle of 90° to one another and at 45° with respect to the optical axis. The pairs are then to be arranged in a manner rotated azimuthally with respect to the optical axis by an angle of 60° to one another. An azimuthal rotation by an angle of 45° results in an 8-fold compression, and a rotation by an angle of 30° even results in a 12-fold compression.

In another group of exemplary embodiments, the path length modulator has a multiplicity of optical channels metal-coated at the end side and of different length and an optical switch by which the measuring light can be sequentially coupled into respectively one of the optical channels. By such a path length modulator the optical path length is thus changed not continuously, but stepwise. The optical channels can in this case each have a free space, through which the measuring light can propagate, and comprise a reflecting surface.

Optical channels of different length can be produced in a particularly space-saving manner if they are formed as optical fibres. The optical fibres can be space-savingly rolled up or otherwise bent, so that the channels of different length can be easily accommodated even in the confined spatial conditions of a processing head.

The optical switch may, for example, be a movably mounted mirror which is optionally curved, in order for example to be able to couple measuring light into optical fibres. However, fibre-optic or integrated spatial multiplexers, as known from optical communication technology, also come into consideration as optical switches.

With the processing head according to the invention, it is possible for the processing head to be assigned a regulating device which is adapted to regulate the focal length of the focusing optics, and/or a direction of the laser radiation set by the scanning device, in such a way that the focal spot is situated at a desired location on the workpiece, the regulating device being able to be supplied with the distance, measured by the coherence tomograph, between the processing head and the workpiece.

In general, it will be preferred if the measuring light passes through at least one part of the focusing optics, by which its focal length can be changed.

When changing the focal length of the focusing optics, the focal spot of the measuring light is thus always automatically moved along therewith. At the same time, at least parts of the focusing optics can be used to focus the measuring light. Because only sufficient focusing of the measuring light, which is preferably less than four times the Rayleigh length, ensures a good quality of the distance measurement with the coherence tomograph.

Through the partial joint use of the focusing optics, it can be ensured, moreover, in a particularly simple manner, that the measuring light is always focused in the same focal plane in which the focal spot of the laser radiation is also situated. For, in general, it is particularly important to know how far the workpiece is away from the processing head at the processing point at which the focal spot of the laser radiation is formed. The measuring light generated by the coherence tomograph does not necessarily have to be directed at the focal spot. Thus, for example, it is possible to provide for the measuring light an additional scanning device which travels scanner-like over a region surrounding the processing point on the workpiece and in this way provides a three-dimensional relief of the surface. It is also possible for the measuring light beam to travel on a circular path around the processing point. Such a circular scanner arranged in the optical path of the measuring light can be realised very easily with the aid of a wobble mirror, a micromirror tiltable about two tilt axes or a rotating wedge plate. The information obtained by a circular scanner is often sufficient for seam tracking.

The coherence tomograph can thus be used in this case not only to position the focal spot optimally on the workpiece, but also for purposes of subsequent seam tracking. In this way, for example, cavities and other defects can be identified in the course of the quality assurance.

In principle, it is also possible to provide for the measuring light dedicated focusing optics and a dedicated scanning device, through neither of which the laser radiation passes. For workpieces with a very pronounced height profile, it is thus possible to perform a highly accurate surface measurement in the wider surroundings of the processing point, since the measuring light and the laser radiation no longer have to be focused in the same focal plane.

Fundamentally, however, the invention can also be used in laser processing devices which do not contain a scanning device. In this case, only the shifting of the focal spot in the axial direction is performed with the aid of the focusing optics, while the lateral shifting of the focal spot is produced by moving the processing head. The subject-matter of the invention is furthermore a method for laser processing of a workpiece with laser radiation, the method comprising the following steps:

a) focusing the laser radiation in a focal spot, the distance between the focal spot and a processing head being changed by changing the focal length of focusing optics included in the processing head;
b) using a coherence tomograph, which includes a reference arm, for measuring the distance to the workpiece;
c) tracking the optical path length in the reference arm synchronously with and dependent on the change of the focal length in step a).

BRIEF DESCRIPTION OF THE DRAWINGS

Further features and advantages of the invention will become apparent from the following description of the exemplary embodiments with the aid of the drawings, in which.

DESCRIPTION OF PREFERRED EXEMPLARY EMBODIMENTS

1. Structure of the Laser Processing Device

Figure 1:
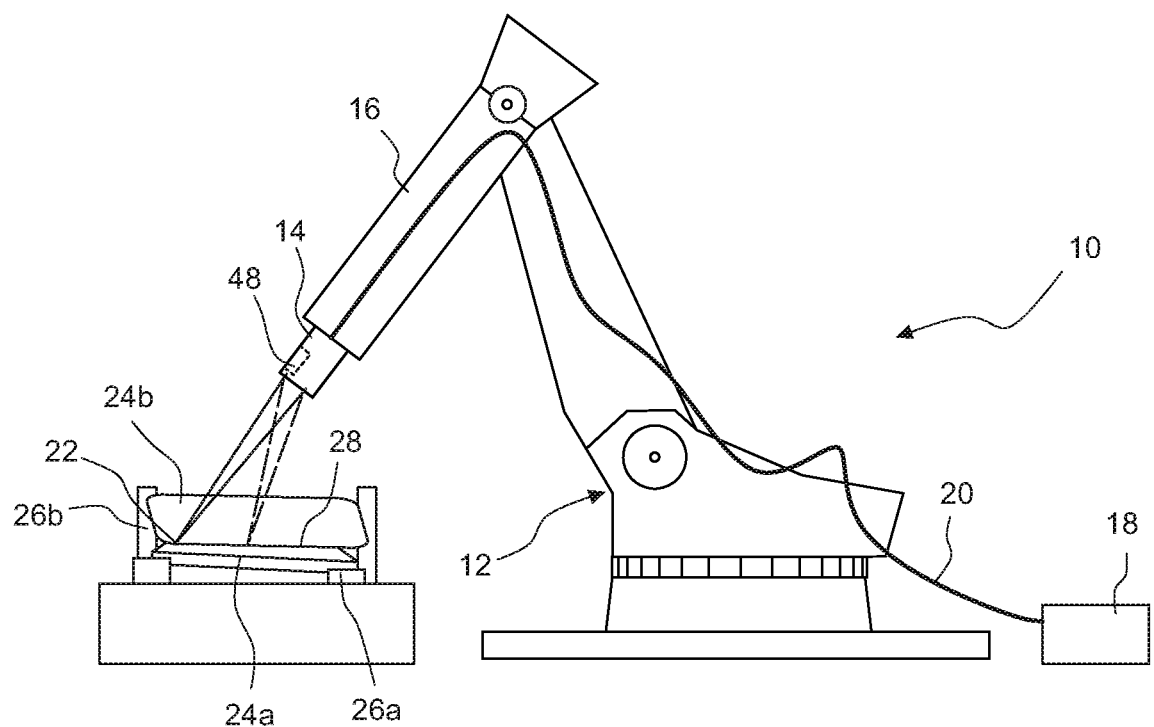
FIG. 1 shows a schematic representation of a laser processing device according to the invention during the welding of two steel plates along a fillet weld.

FIG. 1 shows in a schematic representation a laser processing device 10 having a robot 12 and a processing head 14 according to the invention, which is fastened to a movable arm 16 of the robot 12.

The laser processing device 10 also includes a laser radiation source 18 which is formed in the illustrated exemplary embodiment as a disc laser or fibre laser. Laser radiation 30 generated by the laser radiation source 18 is supplied via an optical fibre 20 to the processing head 14 and focused by the latter in a focal spot 22.

The laser processing device 10 is provided for a remote laser processing of workpieces. The distance between the focal spot 22 and the processing head 14 is therefore about 30 cm to 100 cm. As will be explained below with reference to FIG. 2, the focal length of focusing optics included in the processing head 14 is changeable in order to be able to position the focal spot 22 on the workpiece at different distances from the processing head 14. In addition, the processing head 14 includes a scanning device, with which the laser radiation can be deflected in different directions. In this way, it is possible to position the focal spot 22 at any desired point within a larger volume.

In the exemplary embodiment illustrated in FIG. 1, the workpieces are two galvanised steel plates 24a, 24b which are held in a particular relative position to one another with the aid of handling devices 26a and 26b, respectively. It is further assumed that the laser processing device 10 is to weld a fillet weld at a lap joint 28 between the two steel plates 24a 24b. The control of the laser processing device ensures that the robot 12 and thus the processing head 14 fastened thereto move only slowly or not at all while the focal spot 22 is guided along the lap joint 28. The scanning device and the focusing optics are controlled such that the focal spot 22 moves relative to the processing head 14 and in doing so travels on the surface of the steel plates 24a, 24b along the lap joint 28. During this, an optical coherence tomograph 48 integrated in the processing head 14 continuously measures the distance between the processing head 14 and the steel plates 24a, 24b along the current direction of the laser radiation 30.

Figure 2:
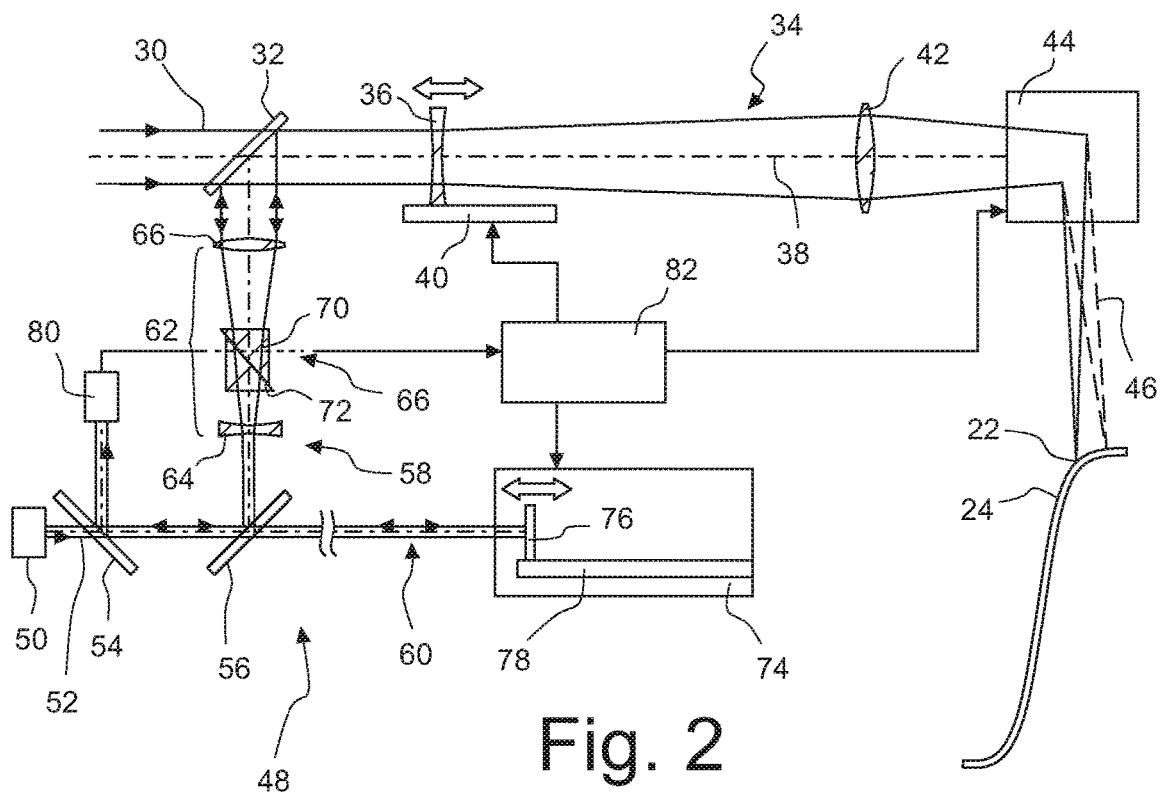
FIGS. 2 and 3 show the beam path in a processing head of the laser processing device shown in FIG. 1 for two different focal spot positions.

FIG. 2 shows the beam path in the processing head 14 in a schematic representation. It is assumed that the laser radiation 30 enters the processing head 14 already collimated. The laser radiation 30 firstly passes through a dichroic first beam splitter 32 and then the focusing optics, designated by 34, of the processing head 14. The focusing optics 34 comprise a diverging first lens 36 which can be moved along an optical axis 38 with the aid of a moving device 40, as indicated by a double-headed arrow above the first lens 36. The focusing optics 34 also comprise a converging second lens 42 which is fixedly arranged. By moving the first lens 36, the focal length of the focusing optics 34 and thus the distance from a light exit window of the processing head 14 can be changed.

In the beam path downstream of the focusing optics 34, the scanning device, already mentioned and designated by 44, is arranged. This device includes one or more galvanically suspended mirrors, with which the laser radiation 30 can be deflected in different directions, as indicated by a dashed beam path 46. Since such scanning devices are known as such in the prior art, a more detailed explanation of the structure is omitted.

Through the interaction of the scanning device 44 with the moving device 40 of the focusing optics 34, the focal spot 22 can be positioned at any desired locations on the steel plates 24a, 24b within a larger volume.

In order to be able to measure the distance of the workpiece from the processing head 14, the latter includes the optical coherence tomograph already mentioned, which is designated as a whole by 48 in FIG. 2. The coherence tomograph 48 comprises a light source 50 for generating measuring light 52, a second beam splitter 54 and a third beam splitter 56, downstream of which the beam path divides into an object arm 58 and a reference arm 60.

In the object arm 58 the measuring light is firstly widened by telescopic optics 62 and then coupled into the beam path of the laser radiation 30 by the first beam splitter 32. The telescopic optics 62 comprise, in the exemplary embodiment illustrated, a diverging lens 64 and a converging lens 66. Arranged between the lenses 64, 66 is an adjustable glass path adapter 68, consisting of two wedge prisms 70, 72 which are displaceable relative to one another and between which an index-matched gel is situated. Through displacement of the wedge prisms 70, 72, the axial length of the glass path adapter 68 can be continuously adjusted. In this way, it is possible to integrate the optical coherence tomograph 48 also into existing processing heads 14 and, with the aid of the glass path adapter 68, always set equal path lengths in dispersing glasses.

Situated at the end of the reference arm is a path length modulator 74 consisting, in the exemplary embodiment illustrated, of a plane mirror 76 which is movable in the axial direction with the aid of a linear drive 78. In this way, the optical path length in the reference arm 60 can be continuously adjusted.

The coherence tomograph 48 further comprises a spectrally resolving light sensor 80 which detects the interference of measuring light, which has been reflected by the steel plates 24a, 24b, with measuring light which has travelled a similar optical distance in the reference arm.

The coherence tomograph 48 operates in the frequency domain (FD-OCT). As a result, for a given optical path length in the reference arm 60, a measuring range in the axial direction of about 8 mm is possible. Since, apart from the path length modulator 74 which has yet to be explained in more detail, such coherence tomographs 48 are known in the prior art, the function will not be explained again in detail here. Fundamentally, coherence tomographs with optical circulators, as described in DE 10 2010 016 862 B3 of the applicant, are also suitable.

Figure 3:
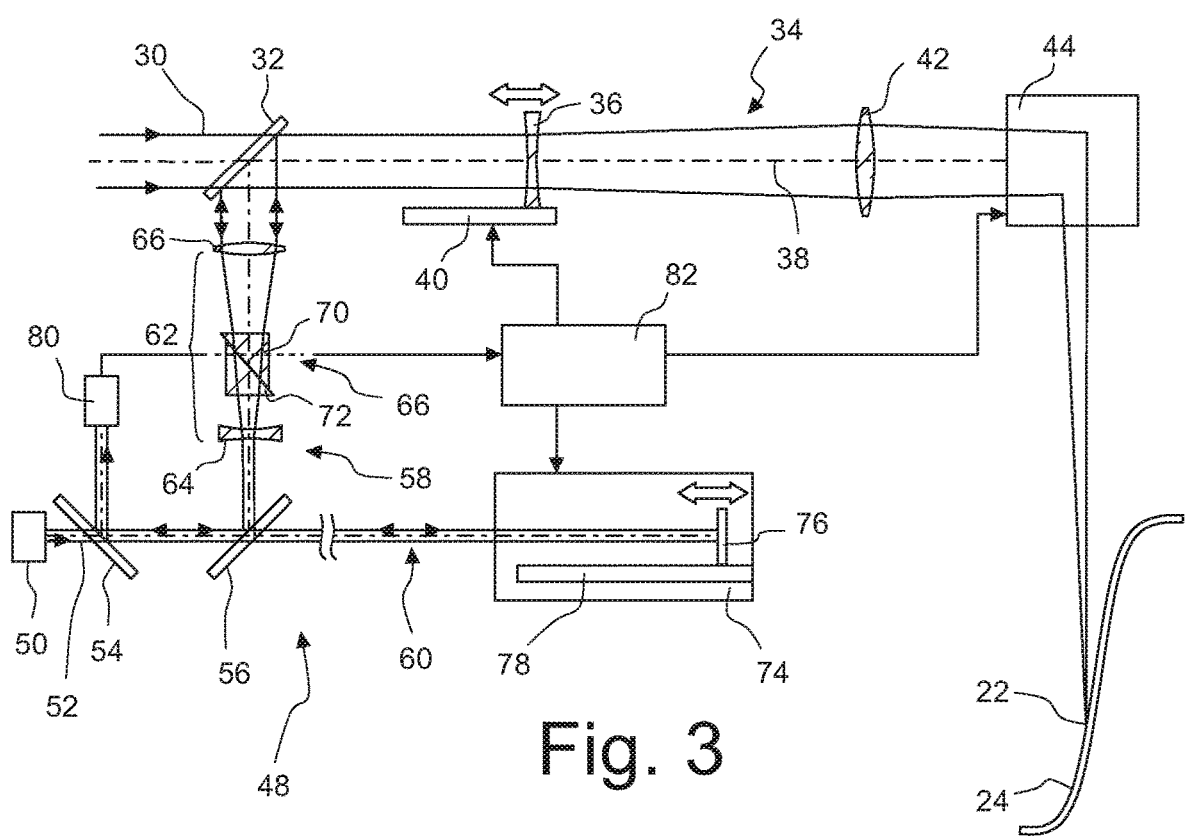

FIG. 3 corresponds to FIG. 2, except that there the focal spot 22 was shifted in the axial direction. For this purpose, the first lens 36 of the focusing optics 34 was displaced by the moving device 40 such that the focal length of the focusing optics 34 lengthens.

If this lengthening goes beyond about 8 mm, the measuring range of the coherence tomograph 48 would thereby be exceeded. Therefore, the plane mirror 76 in the path length modulator 74 is shifted synchronously with the displacement of the first lens 36 by the same amount by which the focal length was lengthened. In this way, the optical path lengths in the reference arm 60 and in the object arm 58 correspond again, so that the entire measuring range of the coherence tomograph 48 of about 8 mm is usable.

In order to synchronise the displacements of the lens 36 of the focusing optics with the plane mirror 76 of the path length modulator 74, the moving device 40 and the path length modulator 74 are connected to a common regulating and control device 82 via signal lines. The regulating and control device 82 also controls the scanning device 44. It is supplied with measuring signals of the light sensor 80 which, after evaluation, provide the optical path length difference in the object arm and the reference arm 58 and 60, respectively. Since the optical path length in the reference arm is known (the axial position of the plane mirror 76 should therefore be detected exactly by an encoder), the regulating and control device 82 can control the moving device 40 of the focusing optics 34 and also the scanning device 44 such that the focal spot is positioned exactly at the desired location on the steel plates 24a, 24b. This positioning is preferably carried out by means of a regulating loop, in which the measured values provided by the coherence tomograph 48 are used for continuous correction of the positioning of the focal spot 22.

2. Path Length Modulators

For workpieces with a large depth profile, the focal spot 22 must be shifted very rapidly by greater distances in the axial direction. For this there suffice short moving distances of the first lens 36 of the focusing optics 34, which are easy to accomplish in spite of the relatively large mass of the first lens 36. The axial shifting of the focal spot 22 can in this case be greater, for example, by an order of magnitude than the moving distance of the first lens 36.

The situation is different, however, in the path length modulator 74. In the exemplary embodiment shown in FIGS. 2 and 3, the beam path of the measuring light 52 in the reference arm 60 is folded twice. This means that with a moving distance $\Delta d$ of the plane mirror 76, the optical path length changes by the amount $2\Delta d$. If, for example, the axial position of the focal spot 22 shifts by 200 mm in 30 ms, the plane mirror 76 must be moved in this short period of time by 100 mm with the aid of the linear drive 78. This requires extremely high accelerations of the plane mirror 76.

a) Beam Folding

Figure 4:
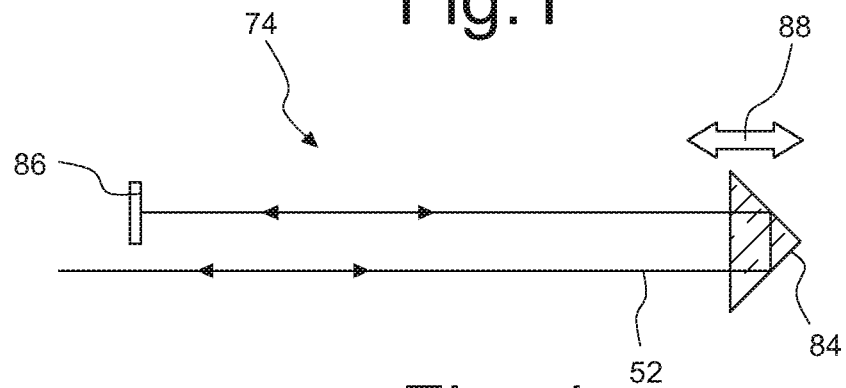
FIG. 4 shows a meridional section through a path length modulator with a beam path folded twice.

In the exemplary embodiment of the path length modulator shown in FIG. 4, the optical path of the measuring light 52 is therefore compressed by multiple folding not only twice, but four times. The plane mirror 76 in this exemplary embodiment is replaced by a 90° prism 84, the hypotenuse surface of which is arranged perpendicular to the direction of incidence of the measuring light 52. The 90° prism 84 therefore deflects the measuring light 52 in a parallel-offset manner and directs it onto a fixed plane mirror 86. The measuring light 52 then travels along the beam path in the opposite direction, so that the distance between the fixed plane mirror 86 and the 90° prism 84 is travelled a total of four times by the measuring light 52.

A shifting of the 90° prism 84 in the axial direction, as indicated in FIG. 4 by the double-headed arrow 88, has the result, with such a 2-fold compression of the beam path, that the optical path length of the measuring light 52 is changed by 4 times the moving distance of the 90° prism 84. Compared with the exemplary embodiment shown in FIGS. 2 and 3, adjusting times approximately half as long are thereby made possible while less constructional space is taken up.

Figure 5:
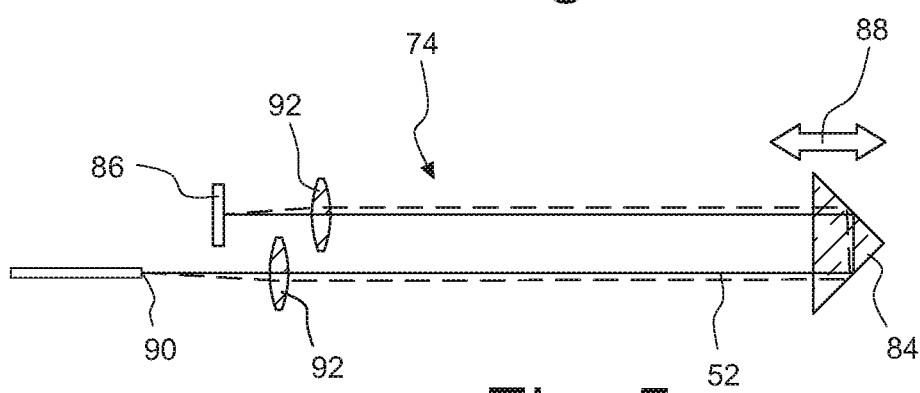
FIG. 5 shows a variant of the path length modulator shown in FIG. 4.

Especially when the measuring light 52 is guided in the coherence tomograph 48 not in free space, but in optical fibres, the variant of a path length modulator 74 shown in FIG. 5 may be expedient. The measuring light 52 emerging slightly divergently at a fibre end 90 is parallel-offset by the 90° prism 84 and directed at a plane mirror 86. In this variant, however, between the 90° prism 84 and the plane mirror 86 there is situated a converging lens 92 which maps the fibre end 90 onto the plane mirror 86. In this way, it is ensured that the measuring light 52 divergently emerging from the fibre end 90 is completely coupled into the fibre end 90 again, after passing through the path length modulator 74.

Figure 6:
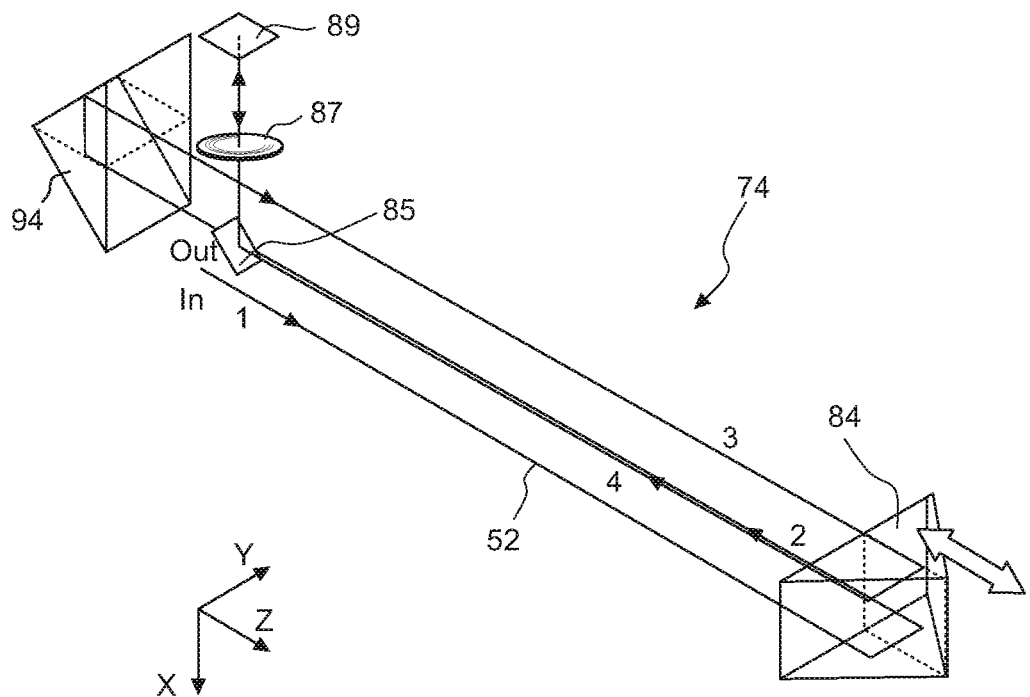
FIG. 6 shows a path length modulator according to the invention with a beam path folded 4 times, in a perspective representation.

FIG. 6 shows another exemplary embodiment of a path length modulator 74, in which two 90° prisms 84, 94 are arranged rotated by 90° to one another azimuthally, i.e. with respect to the Z-axis. Each of the reflecting surfaces of the 90° prisms 84, 94 thereby form an angle of 45° with the optical axis (Z-axis). This enables a 4-fold compression of the beam path. A measuring light beam 1 entering at "In" is reflected, in the exemplary embodiment shown in FIG. 4, in the YZ-plane, by the first 90° prism 84 in a parallel-offset manner (cf. measuring light beam 2). The second 90° prism 94 brings about a parallel offset in the vertical direction, i.e. in the XZ-plane (cf. measuring light beam 3). After a further horizontal offset in the first 90° prism 84, the measuring light 52 is directed as measuring light beam 4 at "Out" by a plane mirror 85 or a prism surface onto a converging lens 87 and a further plane mirror 89. Then the measuring light 52 travels over the above-explained beam path again in the reverse direction. By displacing the first 90° prism 84 in the axial Z-direction indicated by a double-headed arrow, the optical path length is changed here by 8 times the amount of the displacement distance. This corresponds to a compression of the beam path by a factor of 4 compared with a single reflection in the beam path of the reference arm, as known from conventional coherence tomographs.

This structure too can be combined with the principle shown in FIG. 5, according to which a fibre end 90 is mapped onto a reflecting surface.

Figure 7:
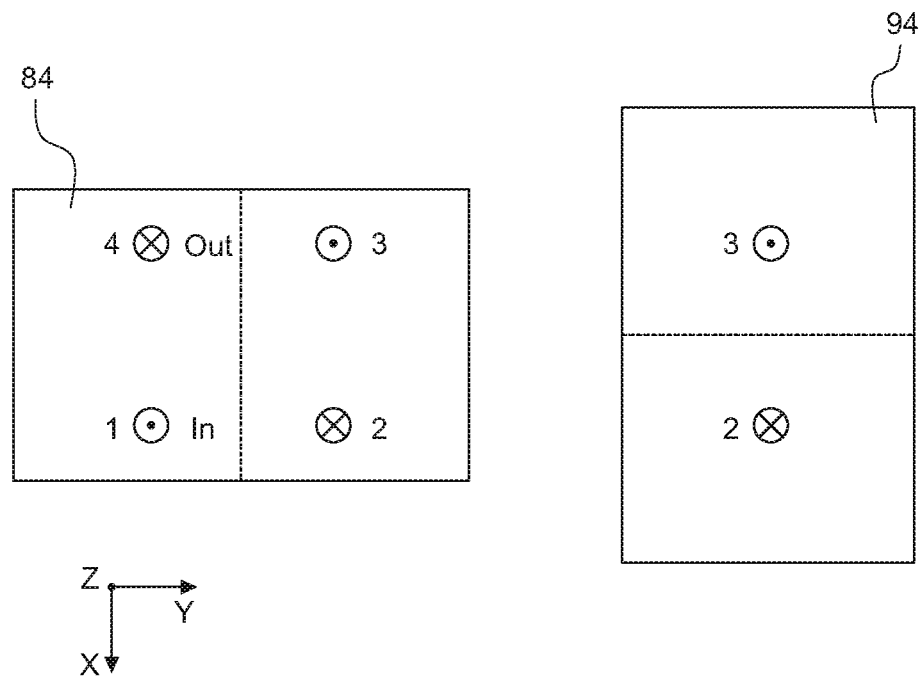
FIG. 7 shows front views of prisms of the path length modulator shown in FIG. 6, on which the points of incidence of the light beams are marked.
Figure 8:
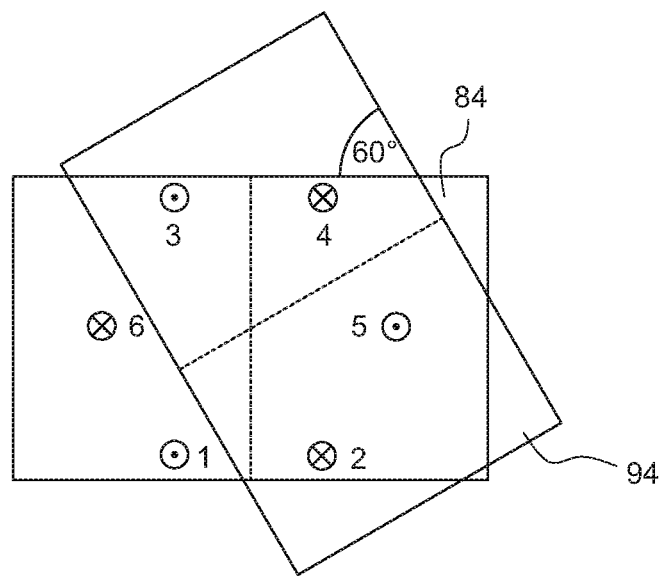
FIGS. 8 to 10 show points of incidence on prisms or reflecting surfaces with a beam path folded 6 times, 8 times and 12 times, respectively.

FIG. 7 shows in a schematic representation the piercing points of the measuring light beam 1 to 4 shown in FIG. 6 on the hypotenuse surfaces of the two 90° prisms 84, 94. A circle with a dot in the middle denotes a measuring light beam entering on the first pass (i.e. before the reflection on the plane mirror 89), while a circle with a cross in the middle indicates an emerging measuring light beam. The dashed lines indicate planes of symmetry of the 90° prisms 84, 94.

Figure 9:
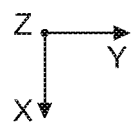
Figure 9:
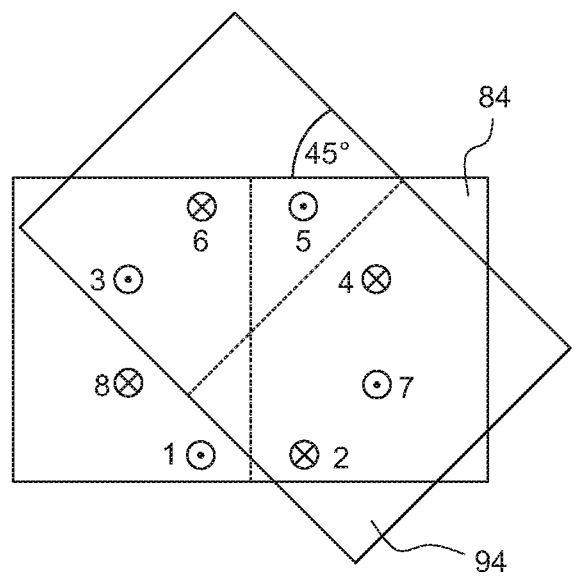
Figure 10:
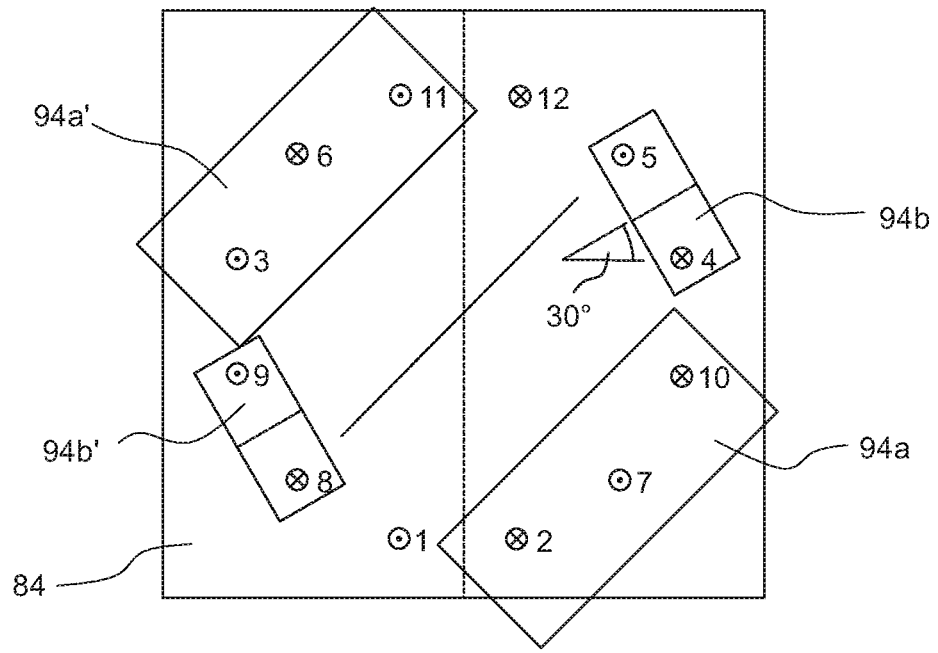

If the two 90° prisms 84, 94 are arranged at an azimuthal angle of 60° to one another, as illustrated in a representation based on FIG. 7, a 6-fold compression of the beam path can thus be realised. In an arrangement at an azimuthal angle of 45°, as shown in FIG. 9, even an 8-fold compression of the beam path can be achieved. Of course, the reflecting surfaces must not be surfaces of a prism. In order, for example, to be able to arrange an axis of the linear drive, it may be expedient to form at least some of the surfaces inclined by 45° with respect to the optical axis as normal plane mirrors. FIG. 10 shows an arrangement for a 12-fold folding of the beam path, in which the second 90° prism 94 has been changed into an arrangement of two plane mirror pairs 94a, 94a' and 94b, 94b'.

b) Optical Switches

In the second group of path length modulators, the optical path length in the reference arm 60 is not continuous, but changes in discrete steps. For this purpose, the path length modulator 74 has a multiplicity of optical channels metal-coated on one side and of different length and an optical switch, with which the measuring light 52 can be sequentially coupled into respectively one of the optical channels.

Figure 11A:
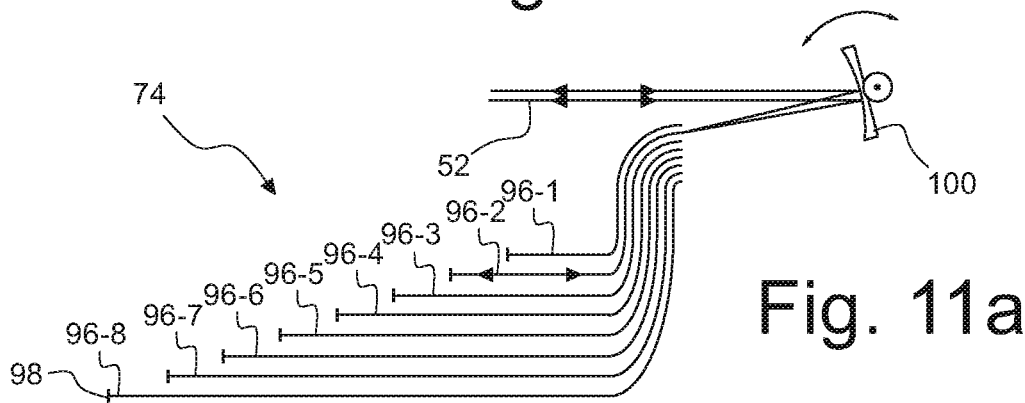
FIGS. 11a and 11b show a path length modulator according to the invention, in which an optical switch couples measuring light into optical fibres of different length, in two different switching positions.
Figure 11B:
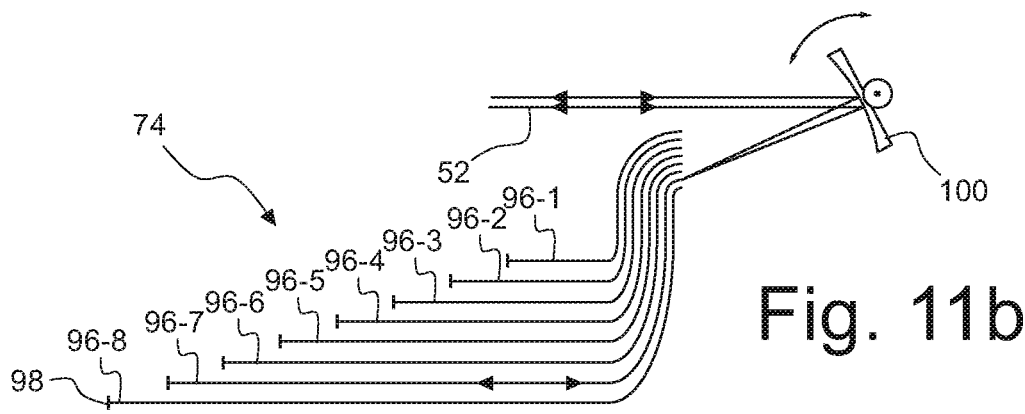

In the exemplary embodiment shown in FIGS. 11a and 11b, the optical channels are formed as optical fibres 96-1 to 96-8. A reflecting surface at the end of each fibre 96-1 to 96-8 is indicated by 98. In the simplest case, the reflecting surface is a metal-coated end surface of the optical fibre. To avoid polarisation dependencies, a so-called Faraday mirror can be attached to an antireflection-coated end surface of the fibre. A Faraday mirror consists of a collimator lens, a birefringent plate which rotates the polarisation direction by 45°, and a plane end mirror. A double rotation of the polarisation device by 45° then also has to be carried out in the object arm 58.

Each of the total of 8 optical fibres 96-1 to 96-8 has a different length. The optical switch is formed as a rotatably mounted tilting mirror 100. Measuring light 52 entering the reference arm 60 is coupled by the tilting mirror 100 into an antireflection-coated end surface of one of the optical fibres; in FIG. 11a this is the fibre 96-2. After passing through the optical fibre 96-2 and reflection at the metal-coated end surface 98, the measuring light 52 emerges from the opposite antireflection-coated end surface and is directed by the tilting mirror 100 back in the direction of the third beam splitter 56 again.

Through pivoting of the tilting mirror 100, the measuring light 52 can be coupled into any of the eight optical fibres 96-1 to 96-8. In each optical fibre 96-1 to 96-8, the measuring light 52 travels a different optical distance.

FIG. 11b illustrates the case where the tilting mirror 100 has been tilted by control by regulating and control device 82 such that the measuring light 52 is coupled into the optical fibre 96-7. As a result, the optical path length increases abruptly.

The optical fibres 96 have the advantage that they can be rolled up or otherwise space-savingly arranged in the processing head 14. As a result, optical path length differences of practically any size can be produced.

Figure 12A:
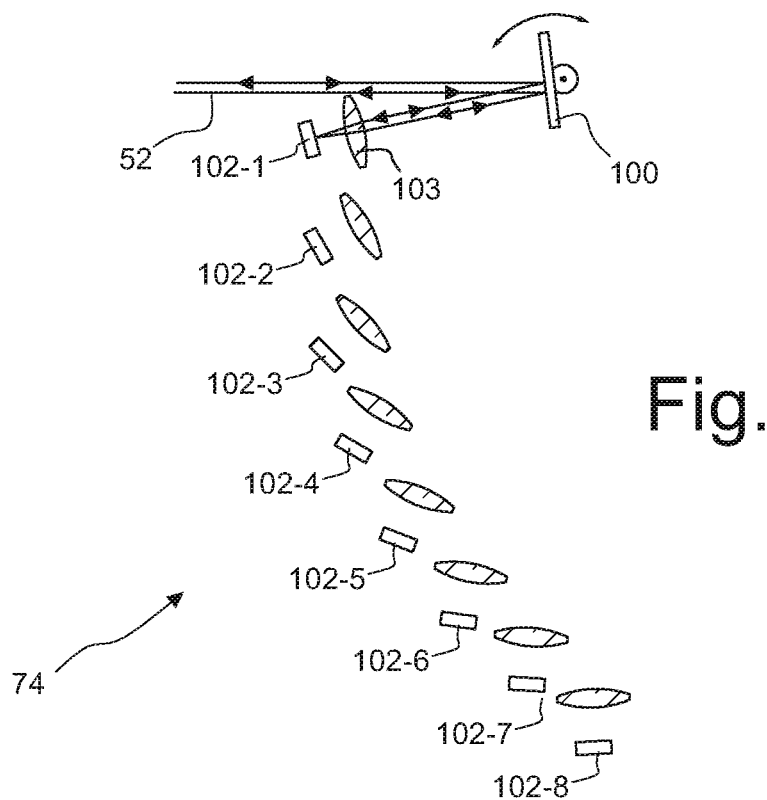
FIGS. 12a and 12b show a variant of the exemplary embodiment shown in FIGS. 11a and 11b, in which the measuring light propagates not in optical fibres, but in free space.
Figure 12B:
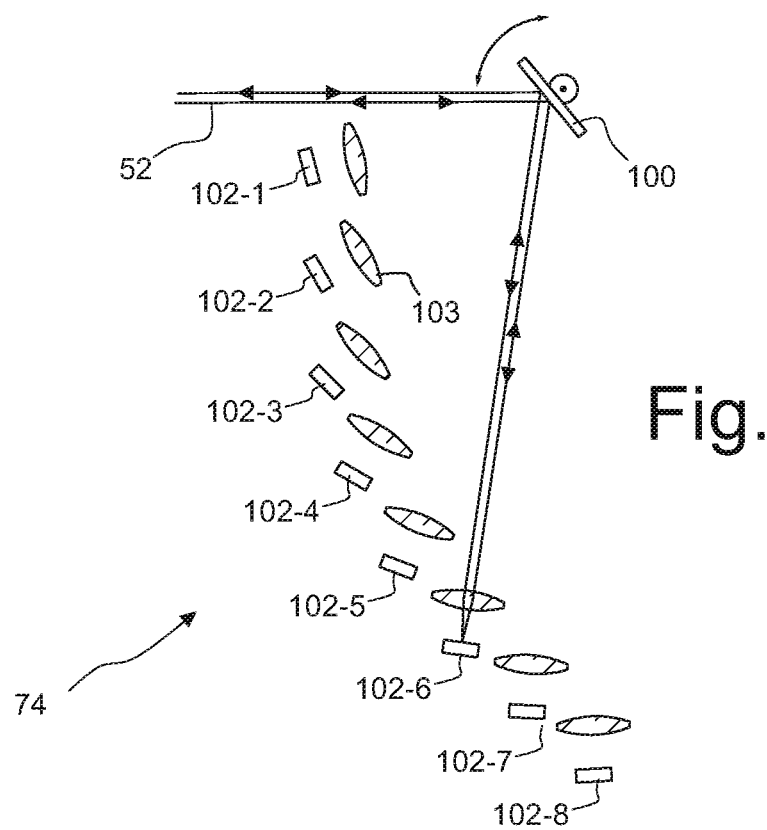

In the exemplary embodiment of a path length modulator 74 shown in FIGS. 12a and 12b, the same principle is transferred to a free-space propagation. The optical fibres 96 are omitted here; instead collimated measuring light 52 is directed from the tilting mirror 100 to one of several plane mirrors 102-1 to 102-8.

The plane mirrors 102 have different distances from the tilting mirror 100 and are so oriented that incident measuring light 52 is always reflected back on itself. As FIG. 12b shows, the optical distance can be abruptly changed by a greater amount here too by pivoting the tilting mirror 100.

In order to make the arrangement less sensitive to adjustment tolerances, a converging lens 103 is respectively arranged in the beam path between the tilting mirror 100 and the plane mirrors 102-1 to 102-8. This lens focuses the incident measuring light 52 to a point on the respective plane mirror 102-1 to 102-8.

If the measuring light 52 emerges from an optical fibre, it can be collimated with the aid of a converging lens before impinging on the tilting mirror 100, as shown in FIG. 5.

3. Further Exemplary Embodiments

Figure 13A:
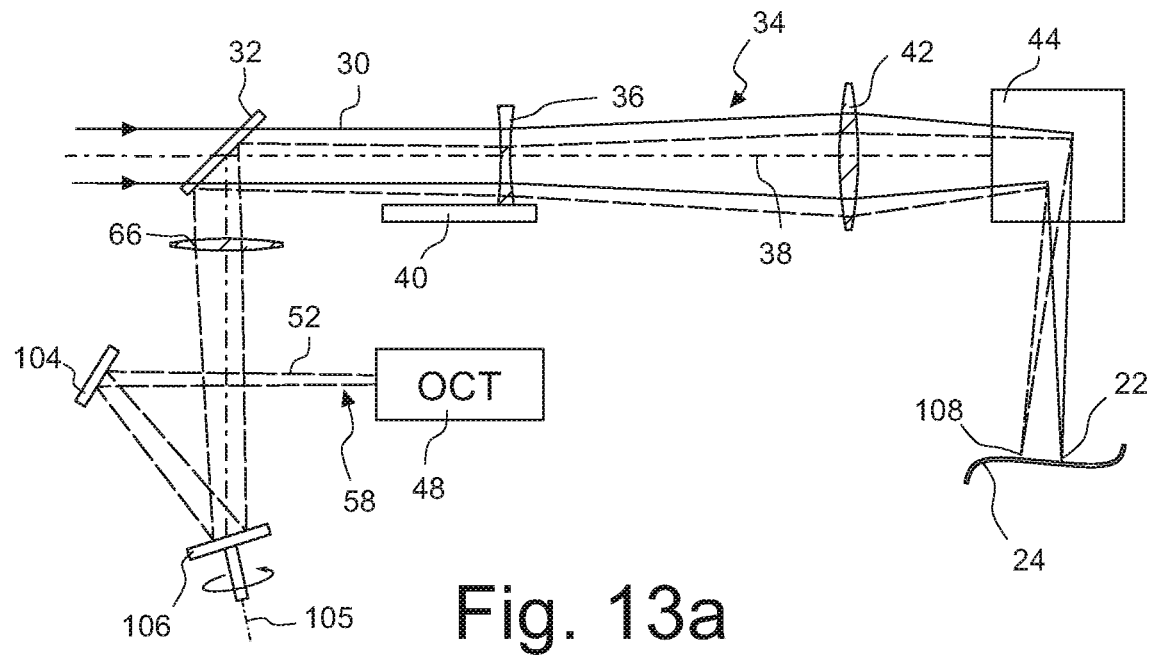
FIGS. 13a and 13b show a part of the beam path shown in FIG. 2, with additionally a wobble mirror being provided for generating a measuring light beam circulating on a circular path.
Figure 13B:
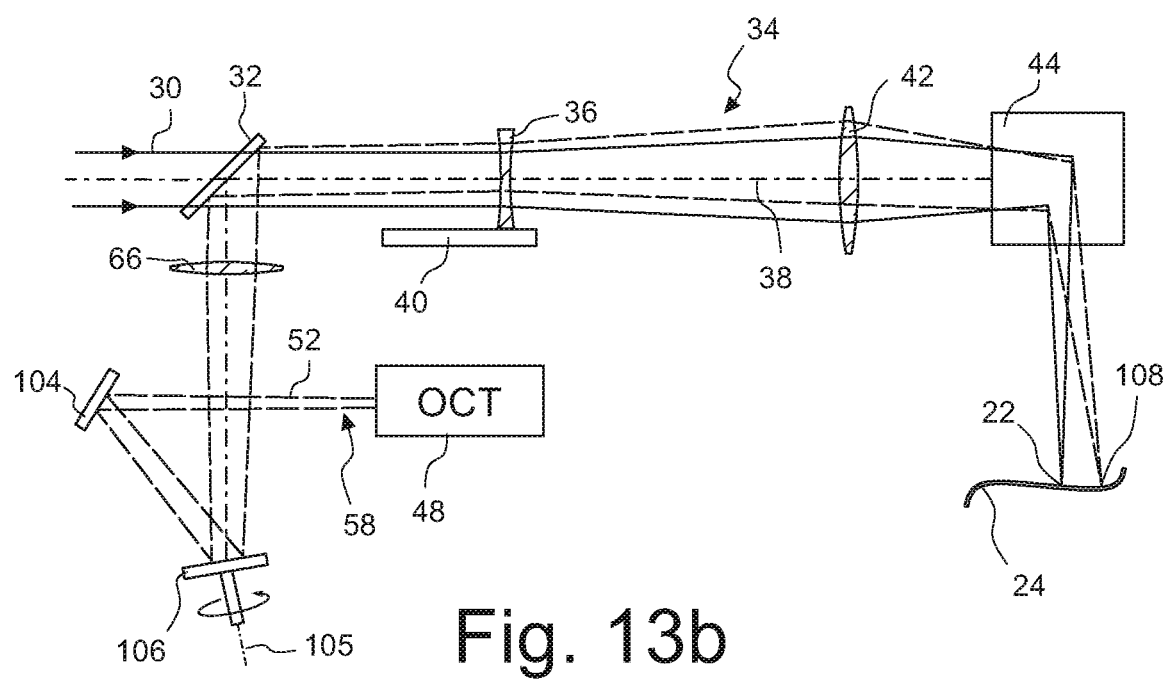

FIGS. 13a and 13b show an alternative exemplary embodiment of a processing head according to the invention in illustrations based on FIG. 2. The measuring light 52 here is not focused in the focal spot 22 of the laser radiation 30, but moves on a circular path around the focal spot 22. For this purpose, the measuring light 52 emerging from the object arm 58 of the coherence tomograph 48 is directed, even before coupling into the beam path of the laser radiation 30, by a deflection mirror 104 onto a plane wobble mirror 106, which is wobblingly mounted. As a result, a surface normal of the wobble mirror 106 passing through the wobble axis 105 describes the path of a right circular cone. Consequently, the focal spot 108 of the measuring light 52 also moves at least approximately on a circular path around the focal spot 22 of the laser radiation 30. Two opposite positions of the measuring light focal spot 108 are shown in FIGS. 13a and 13b. The angle of rotation of the wobble mirror 106 with respect to the wobble axis 105 differs here by 180°.

An approximately circular scanning of the surface of the workpiece 24 to be processed is not suitable for regulation of the focal spot distance, but also allows a detection of the seam following the laser processing. Processing errors can thereby be detected early. The circular shape here ensures an independence from the processing direction. The circular radius here can be in the order of about 5 mm. Then there is still enough time, depending on the measuring results, to intervene in the processing procedure.

Figure 14A:
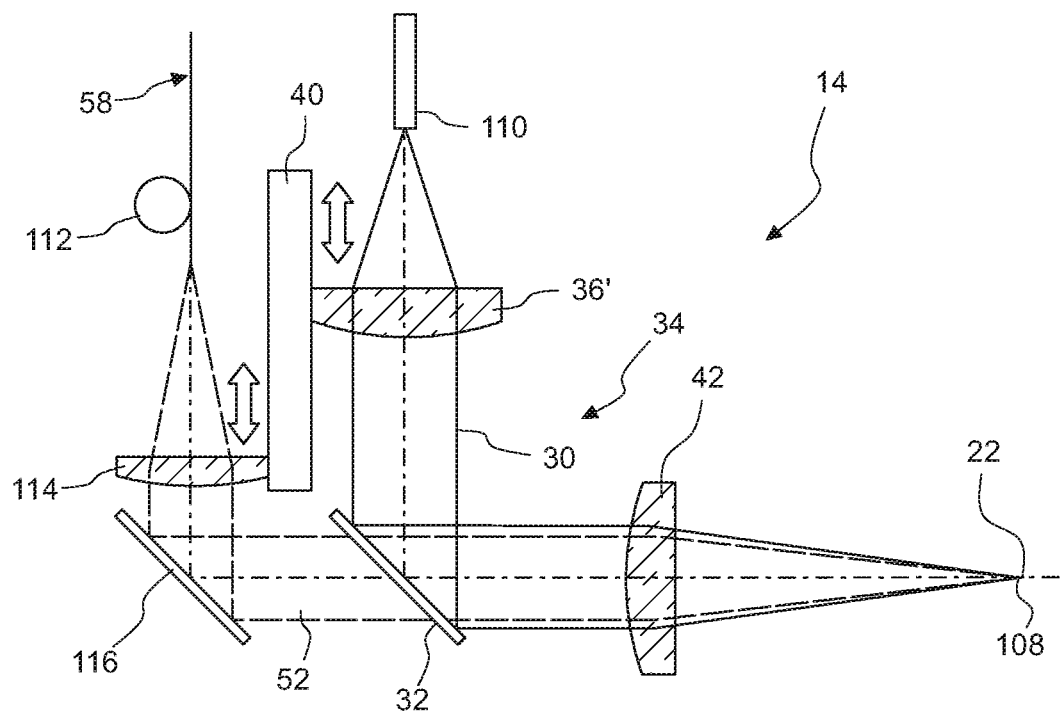
FIGS. 14a and 14b show a detail of a beam path in a processing head according to another exemplary embodiment, in which two lenses are moved in the beam path of the laser radiation and of the measuring light jointly for the axial shifting of the focal spot.
Figure 14B:
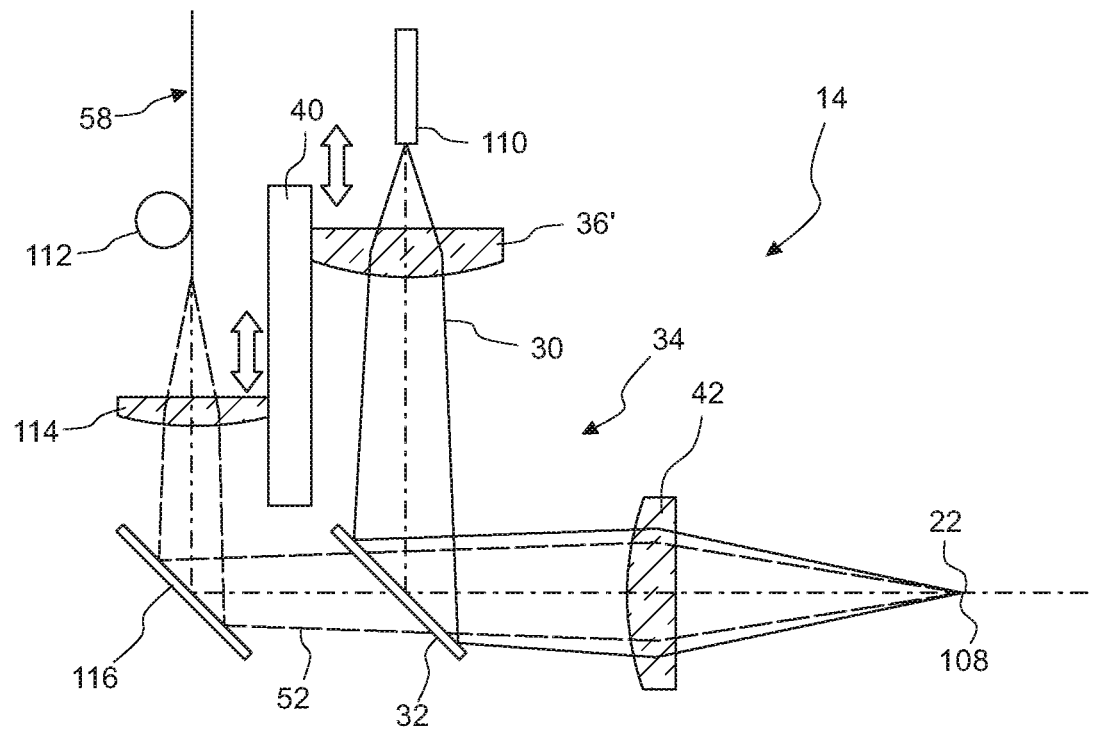

FIGS. 14a and 14b show another alternative exemplary embodiment of a processing head according to the invention in meridional sections for two different focal lengths of the focusing optics 34. In contrast to the exemplary embodiment shown in FIG. 2, the measuring light 52 is coupled into the beam path of the laser radiation 30 not before, but only within the focusing optics 34. In contrast to the exemplary embodiment shown in FIG. 2, in the focusing optics 34 the diverging first lens 36 is replaced by a converging first lens 36'. The converging effect is required, since in this exemplary embodiment the laser radiation 30 exits divergently from a fibre connector 110.

The measuring light guided in the measuring arm 58 of the coherence tomograph 48 likewise exits from an optical fibre 112 and therefore likewise passes through a converging lens 114 before it is coupled via a deflecting mirror 116 into the focusing optics 34.

In order that the focal spot 108 of the measuring light 52 is always superimposed on the focal spot 22 of laser radiation, the converging lens 114 must also be shifted in the beam path of the measuring light 52, since the linearly-movably arranged converging first lens 36' is traversed only by the laser radiation 30. In the exemplary embodiment illustrated, the converging lens 114 is therefore moved by the same moving device 40 as the converging first lens 36'. It is even possible to arrange the two lenses 36', 114 on the same moving carriage, so that they move synchronously and at the same speed.

4. Planning of the Processing Procedure

When planning the processing procedure it should be taken into account that the measuring range of the coherence tomograph 48 consists of two halves, which are interrupted by a dead zone in the middle. The reason for this is that the measuring range of FD-OCTs does not begin with a path difference of 0, but where a significant modulation can already be seen. The upper boundary of the measuring range, however, is reached on arriving at the undersampling.

Figure 15:
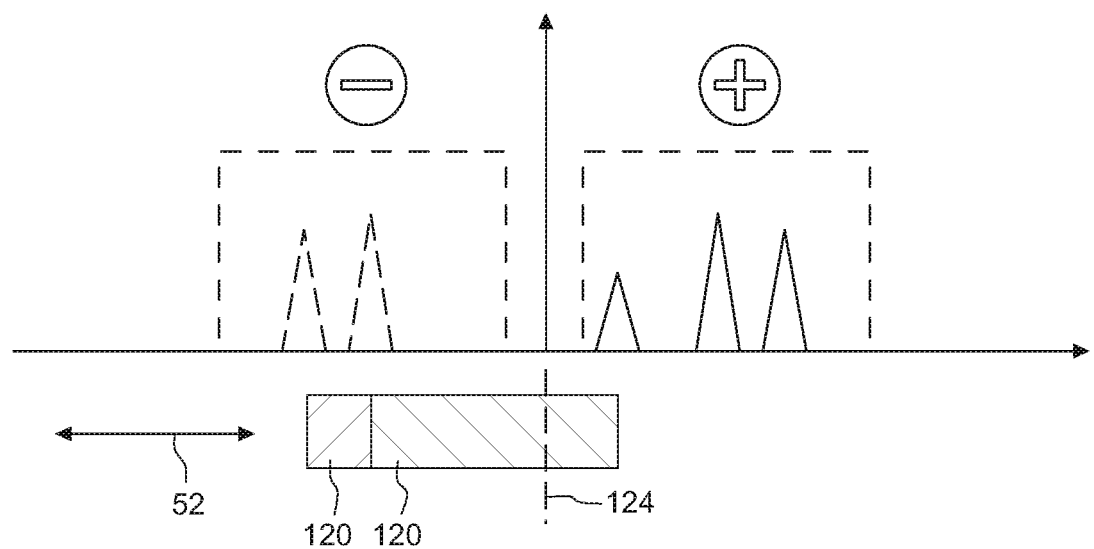
FIG. 15 shows a graph in which measuring signals of the coherence tomograph are plotted schematically.

Without any special measures, it is indistinguishable whether the reference arm 60 or the object arm 58 is longer, i.e. whether the measured optical path length difference is negative or positive. This is illustrated by FIG. 15, which shows a graph in which, by way of example and schematically, the measuring signals of the coherence tomograph 48 are plotted for the case where a measurement object transparent to the measuring light 52 is measured, comprising two layers 120, 122 of different thickness. The virtual position of the reference plane, which is determined by the optical path length in the reference arm 60, is denoted by 124. At each boundary surface of the measurement object, measuring light is reflected. By interference with the measuring light from the reference arm, there is formed in the evaluated depth slice, which is also referred to as an A-scan, a respective distance peak for each boundary surface. The two distance peaks in the "−" OCT measuring subrange have an inverted sign and thus appear in the A-scan of the FD-OCT at mirrored positions. In the evaluation it must therefore be clear from the context which of the measured distances have a negative sign with respect to the reference plane 124.

If the workpieces can be positioned with the precision of the measuring range of the coherence tomograph (about 8 mm), then the processing procedure can be set, for example, so that the optical path length in the reference arm 60 is initially set by the path length modulator 74 so that the distance on travelling along the processing line remains safely in one of the two OCT measuring subranges "+" or "−" shown in FIG. 15.

In the case of heavily stepped objects, the measuring range can be started so that one of the two steps remains in the "−" OCT measuring subrange and the other step remains in the "+" OCT measuring subrange. The transition between upper and lower step must then be recognised from the context, e.g. from the phase position of the measuring signal supplied by a circular scanner and a jump in the OCT measuring value. At this transition the sign of the OCT measuring value must be flipped.

What is claimed is:

1. A processing head for a laser processing device adapted for the processing of a workpiece using laser radiation, wherein the processing head comprises;
   adjustable focusing optics configured to focus the laser radiation in a focal spot having an adjustable distance from the processing head;
   an optical coherence tomograph configured to measure a distance between the processing head and the workpiece by measuring an optical interference between a first measuring light, which was reflected by the workpiece, and a second measuring light, which was not reflected by the workpiece;
   a path length modulator that is configured to change, synchronously with and dependent on a change of the distance of the focal spot from the processing head, an optical path length in an optical path along which the second measuring light propagates;
   a scanner that is arranged in the optical path of the first measuring light;
   a scanning device, which is configured to deflect the laser radiation in different directions; and
   a control device, which is configured to
   i) control a focal length of the focusing optics in such a way that the focal spot is situated at a desired location on the workpiece,
   ii) receive, from the coherence tomograph, information representing the distance between the processing head and the workpiece, and
   iii) use the information received from the coherence tomograph for a continuous correction of a positioning of the focal spot on the workpiece,
   wherein the scanner is arranged exclusively in the optical path of the first measuring light.

2. The processing head of claim 1, wherein, when the focal length of the focusing optics changes by $\Delta d$, the path length modulator changes the optical path length in the optical path by $2\Delta d$.

3. The processing head of claim 1, wherein the optical coherence tomograph is an FD-OCT.

4. The processing head of claim 1, wherein the first measuring light passes through at least one movable part of the focusing optics, and wherein the focal length of the focusing optics depends on a position of the movable part.

5. The processing head of claim 4, wherein the first measuring light, after passing through the focusing optics, is always focused in the same focal plane in which the focal spot of the laser radiation is situated.

6. A processing head for a laser processing device adapted for the processing of a workpiece using laser radiation, wherein the processing head comprises;
   adjustable focusing optics configured to focus the laser radiation in a focal spot having an adjustable distance from the processing head;
   an optical coherence tomograph configured to measure a distance between the processing head and the workpiece by measuring an optical interference between a first measuring light, which was reflected by the workpiece, and a second measuring light, which was not reflected by the workpiece;
   a path length modulator that is configured to change, synchronously with and dependent on a change of the distance of the focal spot from the processing head, an optical path length in an optical path along which the second measuring light propagates;
   a scanning device, which is configured to deflect the laser radiation in different directions; and
   a control device, which is configured to
   i) control a focal length of the focusing optics in such a way that the focal spot is situated at a desired location on the workpiece,
   ii) receive, from the coherence tomograph, information representing the distance between the processing head and the workpiece, and
   iii) use the information received from the coherence tomograph for a continuous correction of a positioning of the focal spot on the workpiece, wherein, at any given time, regions of the workpiece that reflect the first measuring light are not exposed to the laser radiation.

7. The processing head of claim 6, comprising a scanner that is arranged exclusively in the optical path of the first measuring light.

8. The processing head of claim 6, wherein, when the focal length of the focusing optics changes by $\Delta d$, the path length modulator changes the optical path length in the optical path by $2\Delta d$.

9. The processing head of claim 6, wherein the optical coherence tomograph is an FD-OCT.

10. The processing head of claim 6, wherein the first measuring light passes through at least one movable part of the focusing optics, and wherein the focal length of the focusing optics depends on a position of the movable part.

11. The processing head of claim 10, wherein the first measuring light, after passing through the focusing optics, is always focused in the same focal plane in which the focal spot of the laser radiation is situated.

* * * * *